Jan. 27, 1970  E. A. JOHNSON  3,492,568
CHECKING THE RADIO FREQUENCY SHIELDING EFFECTIVITY
OF AN ENCLOSURE WITH AN RF TRANSMITTER CONNECTED
TO ENCLOSURE SURFACES AND RF RECEIVER TO SENSE
SURFACE CURRENT AT LEAKAGE POINTS
Filed Oct. 5, 1967                                       2 Sheets-Sheet 1

INVENTOR
EDGAR A. JOHNSON
BY
SOKOLSKI & WOHLGEMUTH
ATTORNEYS

INVENTOR
EDGAR A. JOHNSON
BY
SOKOLSKI & WOHLGEMUTH
ATTORNEYS

United States Patent Office 3,492,568
Patented Jan. 27, 1970

3,492,568
CHECKING THE RADIO FREQUENCY SHIELDING EFFECTIVITY OF AN ENCLOSURE WITH AN RF TRANSMITTER CONNECTED TO ENCLOSURE SURFACES AND RF RECEIVER TO SENSE SURFACE CURRENT AT LEAKAGE POINTS
Edgar A. Johnson, Tujunga, Calif., assignor to Tamar Electronics Industries, Inc., Los Angeles, Calif., a corporation of Delaware
Filed Oct. 5, 1967, Ser. No. 673,088
Int. Cl. G01r 27/00, 27/04, 31/00
U.S. Cl. 324—57
8 Claims

ABSTRACT OF THE DISCLOSURE

Radio frequency energy is coupled to the walls of a shielded enclosure by connecting the output of a radio frequency transmitter between preselected points on the enclosure. The radio frequency energy circulates around the surfaces of the enclosure to provide relatively uniform distribution thereof. A portable radio frequency receiver having an antenna and an output indicator indicating the level of the signals received thereby is used to scan the wall surfaces of the enclosure opposite the surfaces on which the radio frequency energy is distributed, leakage points in the shielding being indicated by a rise in the input to the receiver as indicated on its output indicator.

---

This invention relates to radio frequency (RF) test measurements and more particularly to a method and apparatus for checkinig radio frequency shielding effectivity. In testing RF equipment, it is often necessary to make various tests in a room forming an enclosure which is effectively shielded against RF signals, this to avoid extraneous signals from interfering with the test measurements being taken. This type of shielded enclosure must be carefully checked to make sure that there are no leakage points therein. This is generally accomplished by placing a transmitter with an antenna on the outside of the enclosure and a receiver with a similar antenna within the enclosure. The receiver and transmitter are then moved together on opposite sides of the shielding around the entire enclosure to check for leakage spots which are indicated by a rise in the level of the energy transmitted through the enclosure when such spots are reached. This is a laborious, two-man operation which is quite time consuming. Further, it is often difficult to accurately pinpoint the leakage areas by this technique in view of the coordinated effort between the two operators which is necessary to determine the precise spot where the radio frequency energy is leaking through.

The importance of assuring the effectiveness of the RF shielding of an enclosure also presents itself in the design of cabinets for radio frequency transmitters and receivers, in which instance such shielding is necessary to prevent the radiation of extraneous radio frequency signals generated within the cabinet and additionally, in the case of receivers, to prevent extraneous signals from the outside to enter the receiver other than through the receiving antenna. There is thus also a need in radio frequency transmitter and receiver design for an efficient technique for checking the effectivity of the radio frequency shielding of the cabinets used therefor.

The technique and apparatus of this invention provide simple yet highly effective means for accurately checking the shielding effectivity of a radio frequency enclosure. The tests involved can be made by a single operator and can be used to accurately check relatively small enclosures within which is would be impossible to manipulate test equipment in checking shielding, as in the above described prior art technique.

Briefly, the invention is practiced as follows:

The output of a radio frequency transmitter is connected between opposite corners of the enclosure to be tested. The radio frequency energy may be coupled either to the outside or the inside walls of such enclosure, depending upon the particular application requirements. The radio frequency energy so coupled circulates in a relatively uniform manner and in a predictable pattern around the surfaces of the enclosure. Preferably, means are provided to maintain the current output of the RF source constant to facilitate the accuracy of the measurements made. This may be accomplished by placing a high impedance coupler between the RF energy source and the enclosure or by providing a negative feedback or AGC circuit in the transmitter. A radio frequency receiver which has pick-up means for picking up RF energy which may comprise an antenna, is then moved back and forth adjacent to the surfaces of the walls of the enclosure opposite to the surfaces to which the RF energy is coupled. The receiver has an output meter indicating the level of the RF energy received thereby. All of the wall surfaces of the enclosure are thus scanned, any leakage spot in the enclosure walls being indicated by a rise in the reading on the receiver output meter.

It is therefore an object of this invention to provide an improved method and technique for checking the radio frequency shielding effectivity of a shielded enclosure.

It is a further object of this invention to increase the rapidity and accuracy with which radio frequency leakage spots in a shielded enclosure can be ascertained.

Other objects of this invention will become apparent from the following description taken in connection with the accompanying drawings, of which:

Figure 1:
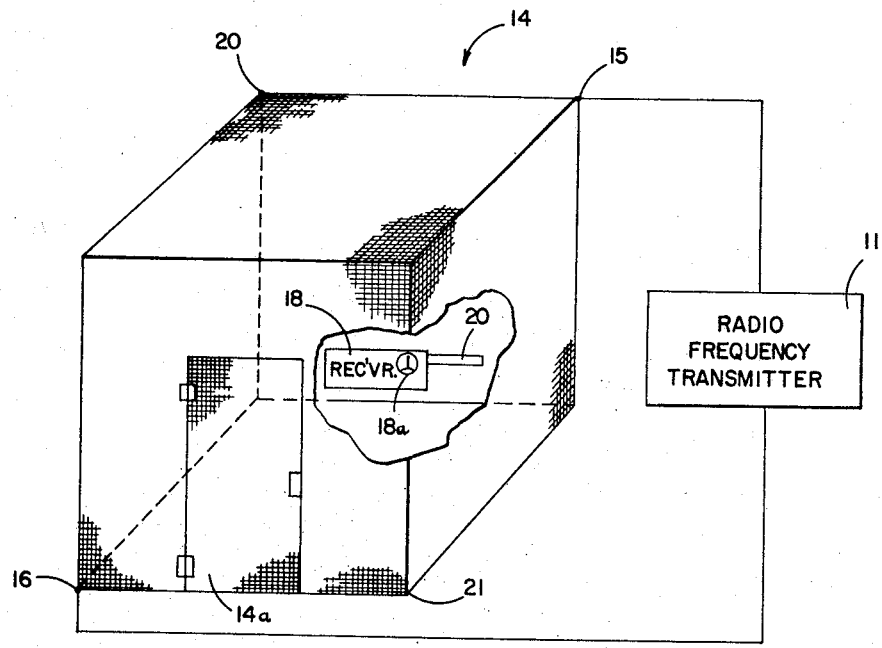
FIG. 1 is a schematic drawing illustrating a first embodiment of the invention.

Referring now to FIG. 1, a first embodiment of the invention is illustrated. The output of radio frequency transmitter 11 is fed to shielded enclosure 14 at the opposite corners 15 and 16 thereof. This end result may conveniently be achieved by coupling one terminal of the transmitter output to point 15 and connecting point 16 to the other terminal of the transmitter, which generally coincides with the chassis ground thereof. While it has been found that optimum results can be obtained by coupling the transmitter output to diagonally opposite corners of the enclosure, it is to be noted that moderately good results can be achieved by coupling between other spaced points on the enclosure walls. Radio frequency transmitter 11, it has been found by experience, is preferably at a low frequency, for example, between 70 and 150 kilocycles. Such lower frequencies are preferable because it is easier to generate a good current flow along the surfaces of the enclosure at such lower frequencies without encountering undue losses. It is further easier to achieve a uniform and predictable flow with energy in this low frequency range. In an operative embodiment of the device of the invention a frequency of 95 kilocycles has been utilized. The energy coupled to the outside of enclosure 14 at points 15 and 16 circulates relatively uniformly around the outside surfaces thereof and tends by virtue of "skin" effect to stay on said surfaces rather than penetrating through to the opposite surfaces.

Receiver 18, which has RF pickoff means in the form of antenna 20, is taken by an operator within enclosure 14, which may be a screened room, the door 14a thereof being closed so that the enclosure is functioning to provide its best shielding effectivity. Receiver 18 may be a conventional TRF or superheterodyne type, of adjustably, standardized gain and having an output meter 18a thereon to accurately indicate the magnitude of the RF signals received. Antenna 20 is then moved back and forth in scanning fashion along all of the inside wall surfaces of the enclosure to completely cover the surface area. Any leakage points in the screen are indicated by a distinct rise in the signal indicated on the meter 18a, this rise being manifested by virtue of the fact that such a leakage point, more RF energy will penetrate through from the outside surface of the enclosure to the opposing inside surface thereof.

After this first complete scan has been made, the scanning procedure is repeated with the output of transmitter 11 now connected between a different pair of enclosure diagonals, such as for example between points 21 and 22. This second check is necessary to assure accurate readings, as it has been found that for each pair of diagonals there is a point on the surface of the enclosure at which the RF energy is at a null. At this particular point of the enclosure, therefore, it would be impossible to check for leakage. This null point occurs at a different position for each pair of diagonals to which the radio frequency energy is coupled. Thus, the second scanning check assures the accurate measurement of the shielding effectivity of all portions of the shielded enclosure.

Figure 2:
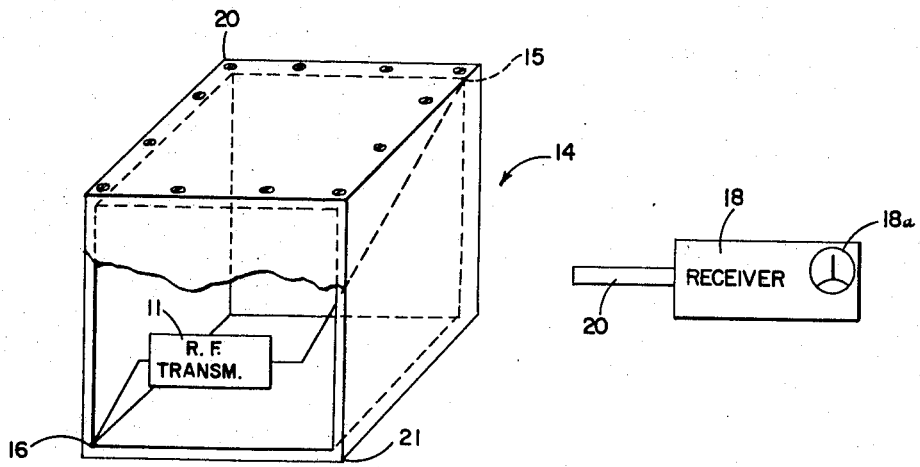
FIG. 2 is a schematic drawing illustrating a second embodiment of the invention.

Referring now to FIG. 2, a second embodiment of the device of the invention is illustrated. This second embodiment is particularly suitable for measuring the shielding effectivity of cabinets for housing radio frequency equipment, where it is difficult or impossible to effectively scan the inside surfaces of the enclosure due to space limitations. In this instance, radio frequency transmitter 11, which is this case would generally be of relatively compact design, is placed within the enclosure. The radio frequency output thereof is coupled to the opposite diagonals 15 and 16 in the same fashion as described in the embodiment of FIG. 1, except that in this instance the attachment is made on the inside surfaces of the enclosure. The outside surfaces of enclosure 14 are then scanned by means of antenna 20 in the same fashion as described in connection with the first embodiment, any leakage points being indicated by a distinct rise in the output indicated by meter 18a. As for the first embodiment, radio frequency energy should be coupled to a second pair of diagonals such as points 21 and 22 for a second scanning run.

It thus can be seen that the embodiment of FIG. 2 is utilized in checking shielding effectiveness in the same general manner as that of FIG. 1, the only difference being that the radio frequency energy is coupled to the inside of the enclosure rather than the outside thereof, with the receivers also being in opposite locations.

Figure 3:
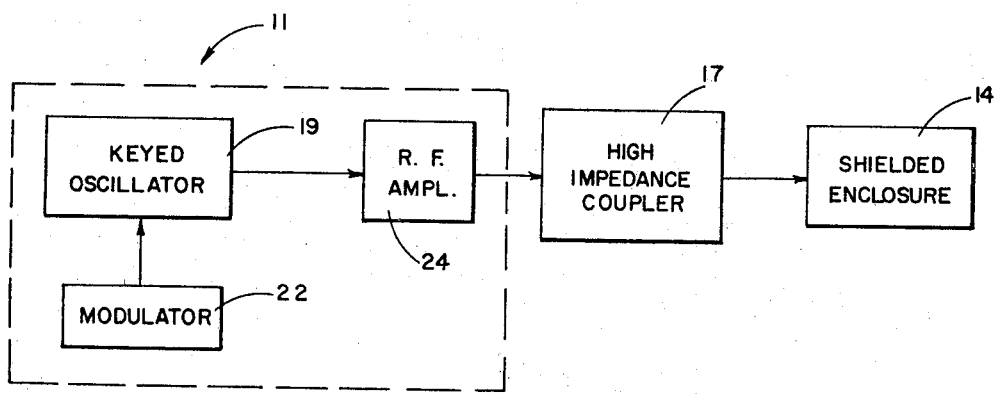
FIG. 3 is a block diagram illustrating a first device for maintaining constant current in the output of the radio frequency generator utilized in the device of the invention.

Referring now to FIG. 3, a device for achieving a substantially constant current output from RF generator 11 to shielded enclosure 14 is illustrated. Such a constant current output is important in that it enhances the accuracy of the measurement capability. Radio frequency generator comprises a keyed oscillator 19 which is keyed on and off at an audio frequency, which may, for example, be of the order of 1,000 cycles, by means of modulator 22. This provides a convenient audio signal for use in providing an aural signal for the operator. The modulator, however, is not essential for operation of the device. The output of radio frequency oscillator 19 is fed to radio frequency amplifier 24, the output of which is fed to high impedance coupler 17. Coupler 17 may comprise a resistive impedance, a capacitive impedance or an inductive impedance, which is relatively high at the transmission frequency as compared with that of shielded enclosure 14 and the lead wire utilized to couple the energy thereto. It has been found in a practical embodiment of the device of the invention that an impedance of about 1,000 ohms for coupler 17 is adequate to provide the necessary high impedance coupling to achieve the desired constant current in shielded enclosure 14, where this shielded enclosure and the wires coupling the RF energy thereto have an impedance of the order of 10 ohms. The fact that the RF current fed to shielded enclosure 14 is reactive does not affect the radiation capabilities thereof in making the desired measurements. Therefore, it is preferable to utilize inductive or capacitive reactance in high impedance coupler 17 rather than resistance to avoid any significant power dissipation in this coupling element.

Figure 4:
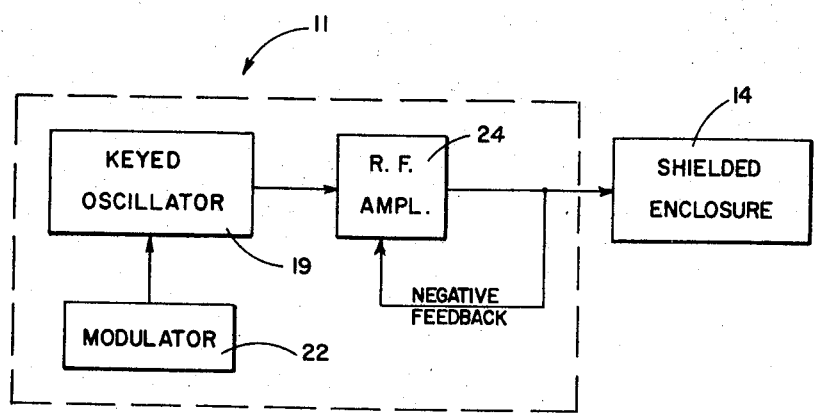
FIG. 4 is a block diagram illustrating a second device for maintaining constant current in the output of the radio frequency generator.

Referring now to FIG. 4, an alternative technique for achieving a constant current output to shielded enclosure 14 is illustrated. In this instance, rather than utilizing a high impedance coupling element, constant current is maintained by negative feedback from the output of RF amplifier 24 to a point closer to or at the input of such amplifier. This end result may be achieved by the negative feedback of radio frequency energy directly or by utilizing an automatic gain control circuit in which a portion of the RF output is rectified and filtered to provide a negative feedback D-C bias signal to an appropriate stage of the RF amplifier. This type of negative RF feedback and automatic gain control is well known in the art and therefore need not be explained in detail. Thus, by the techniques described in FIGS. 3 and 4, a substantially constant current can be provided to shielded enclosure 14 to provide higher accuracy in the leakage measurements made by the technique of the invention and by virtue of its automatic adjustment eliminates the necessity for tuning and the operator error inherent therein.

The technique and apparatus of this invention thus provide simple yet highly effective means for accurately ascertaining leakage points in a radio frequency shielded enclosure. Such measurements can be made by a single operator in a relatively short period of time as compared with prior art techniques. This technique further enables the accurate checking of the shielding capabilities of cabinets for housing radio frequency equipment.

I claim:
1. A method of checking the radio frequency shielding effectivity of a shielded enclosure having an inner set and an outer set of wall surfaces comprising the steps of:
    connecting the output of a radio frequency transmitter to one of said sets of surfaces of said enclosure between preselected points thereon so as to cause substantially uniform radio frequency current flow on said one of said sets of surfaces of said enclosure,
    scanning the other of said sets of wall surfaces of said enclosure with the pickoff member of a radio frequency receiver tuned to the frequency of said radio frequency current, and
    detecting a rise in the signal received by said receiver as said scanning is being accomplished as an indication of a leakage point in said enclosure.
2. The method as recited in claim 1 wherein the radio frequency output of said transmitter is connected to diagonally opposing corners of the outside walls of the enclosure and the receiver is utilized to scan the surfaces of the inside walls thereof.
3. The method as recited in claim 1 wherein the radio frequency energy is connected to diagonally opposite corners of the inside walls of the enclosure, and the receiver is utilized to scan the surfaces of the outside walls of the enclosure.

4. The method as recited in claim 2 and additionally including the step of connecting the output of the transmitter between a second pair of diagonally opposite corners of the enclosure and scanning the surfaces of the enclosure a second time in the same manner as scanned the first time.

5. The method as recited in claim 2 wherein the enclosure comprises a shielded room.

6. The method as recited in claim 3 wherein the enclosure comprises a cabinet for housing radio frequency equipment.

7. In combination, a radio frequency shielded enclosure having a generally box-like configuration with an inner set and an outer set of wall surfaces,
 a radio frequency transmitter, means for connecting the out put of said radio frequency transmitter between preselected points on one of said sets of surfaces of the walls of said enclosure, said connecting means including a high impedance coupling device for maintaining the current fed from said transmitter to said enclosure substantially constant, and
 a portable receiver tuned to the frequency of said radio frequency energy and having an antenna for picking up said radio frequency energy and an output indicator for indicating the magnitude of said energy,
 whereby when said antenna is moved back and forth along the other of said sets of surfaces of the walls of said enclosure opposite to the surfaces to which the radio frequency energy is coupled, leakage points in said enclosure are indicated by said receiver indicator.

8. In combination, a radio frequency shielded enclosure having a generally box-like configuration with an inner set and an outer set of wall surfaces,
 a radio frequency transmitter, said transmitter including circuit means for maintaining the current output thereof substantially constant,
 means for connecting the output of said radio frequency transmitter between preselected points on one of said sets of surfaces of the walls of said enclosure, and
 a portable receiver tuned to the frequency of said radio frequency energy and having an antenna for picking up said radio frequency energy and an output indicator for indicating the magnitude of said energy,
 whereby when said antenna is moved back and forth along the other of said sets of surfaces of the walls of said enclosure opposite to the surfaces to which the radio frequency energy is coupled, leakage points in said enclosure are indicated by said receiver indicator.

References Cited

UNITED STATES PATENTS 2,537,737 1/1951 Chamberlin.
3,236,935 2/1966 Patton _____ 174—35.4

OTHER REFERENCES

DeVore, Charles, Measuring the Effectiveness of Shielding Materials, in Electrical Manufacturing 52(2), pp. 122–125, August 1953.

Intrator, A. M., The Use of Sheet Steel for the Construction of Shielded Rooms, in AIEE Transactions, 72 (1), pp 599–605, November 1953.

EDWARD E. KUBASIEWICZ, Primary Examiner

J. M. HANLEY, Assistant Examiner

U.S. Cl. X.R.

174—35.4; 324—58.5.